3,159,190
BLENDED-BEVERAGE DISPENSING MACHINE
Richard J. Skiera, Chicago, and Paul K. Phillips, Lombard, Ill., assignors to Karma Corp., Elmwood Park, Ill., a corporation of Illinois
Filed Sept. 27, 1961, Ser. No. 141,040
10 Claims. (Cl. 141—369)

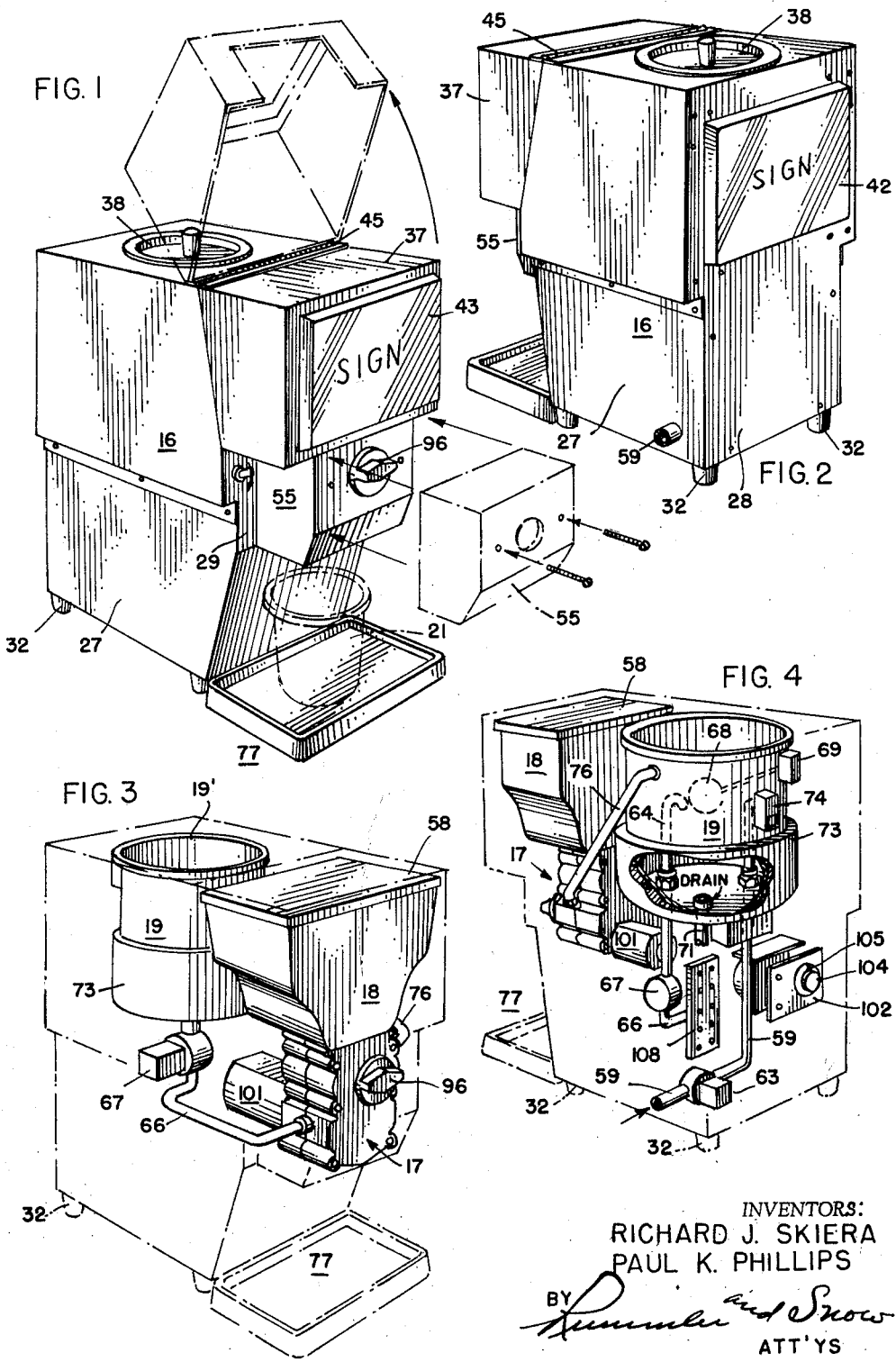
Dec. 1, 1964     R. J. SKIERA ET AL     3,159,190
BLENDED-BEVERAGE DISPENSING MACHINE
Filed Sept. 27, 1961     4 Sheets-Sheet 1
INVENTORS:
RICHARD J. SKIERA
PAUL K. PHILLIPS
ATT'YS

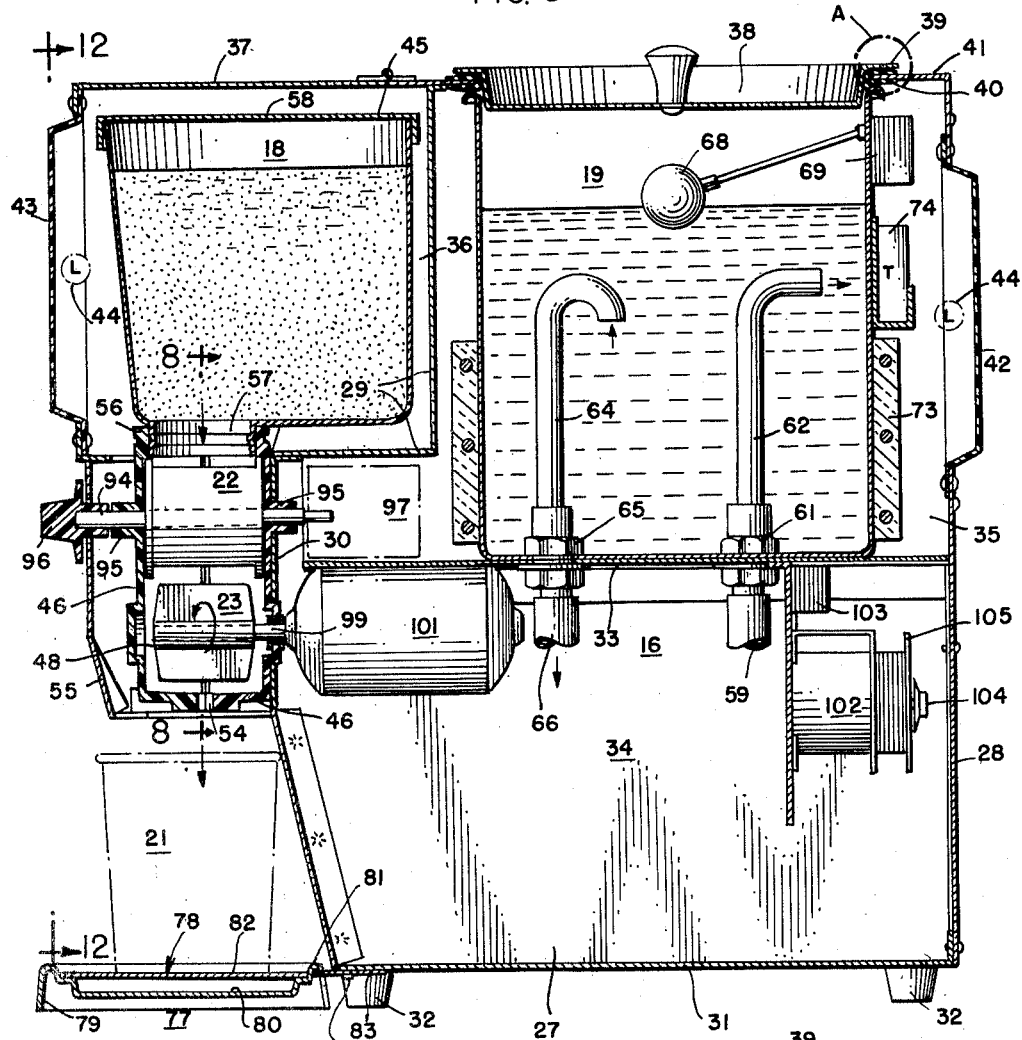
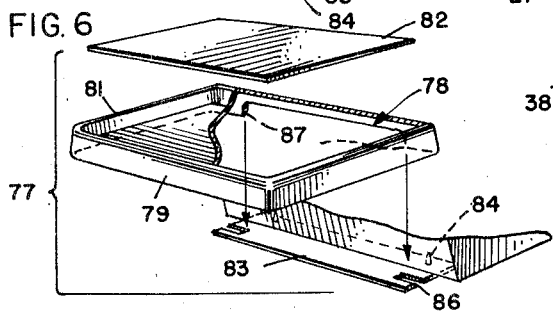
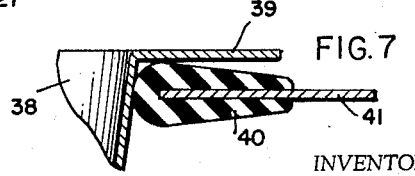
INVENTORS:
RICHARD J. SKIERA
PAUL K. PHILLIPS
BY
ATT'YS

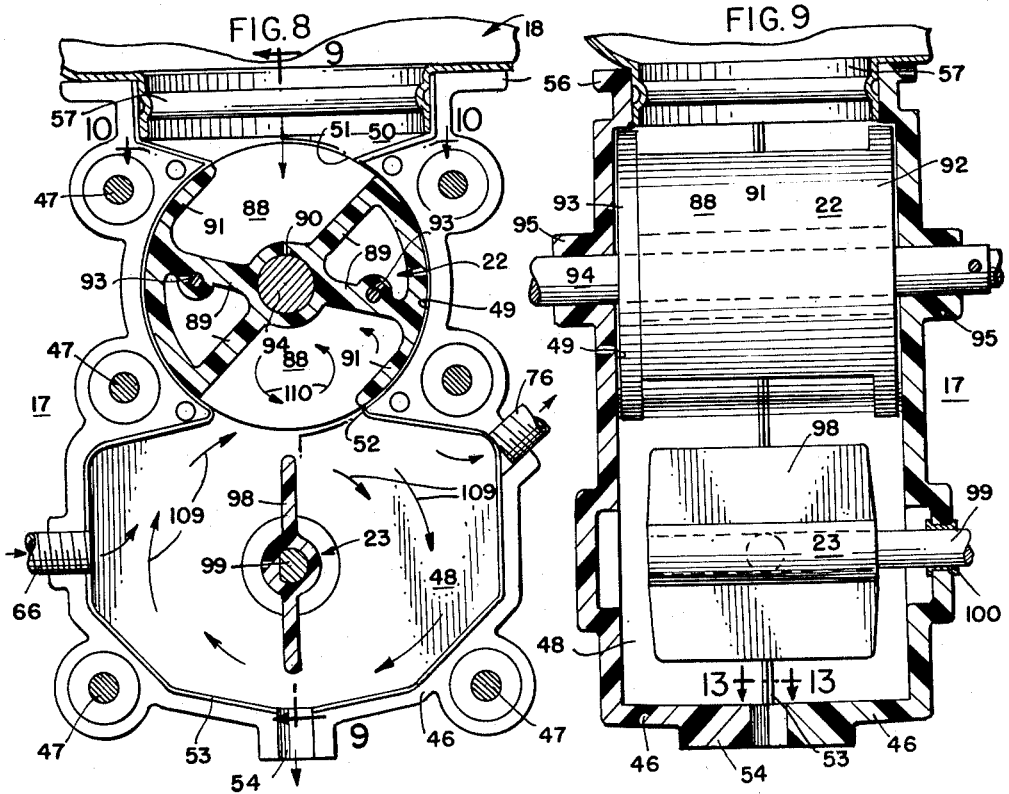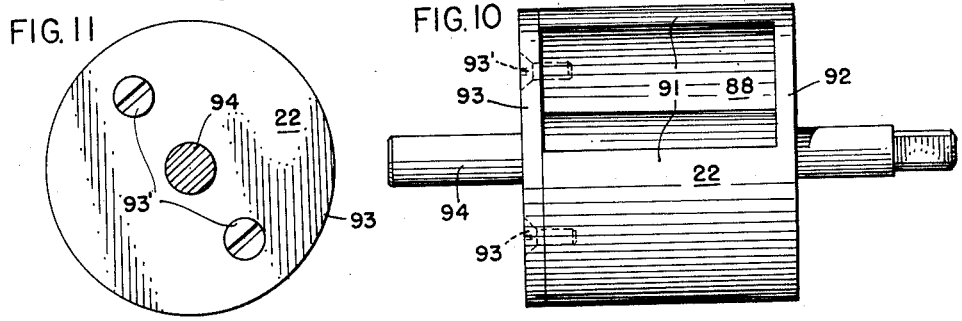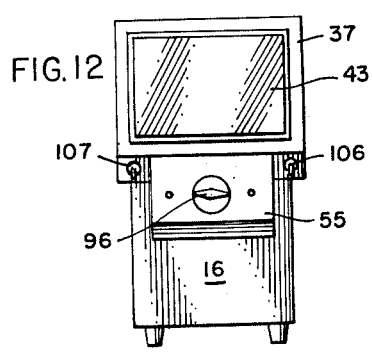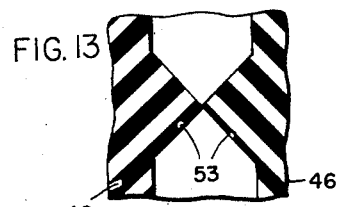
INVENTORS:
RICHARD J. SKIERA
PAUL K. PHILLIPS
ATT'YS Dec. 1, 1964 R. J. SKIERA ETAL 3,159,190
BLENDED-BEVERAGE DISPENSING MACHINE
Filed Sept. 27, 1961 4 Sheets-Sheet 4
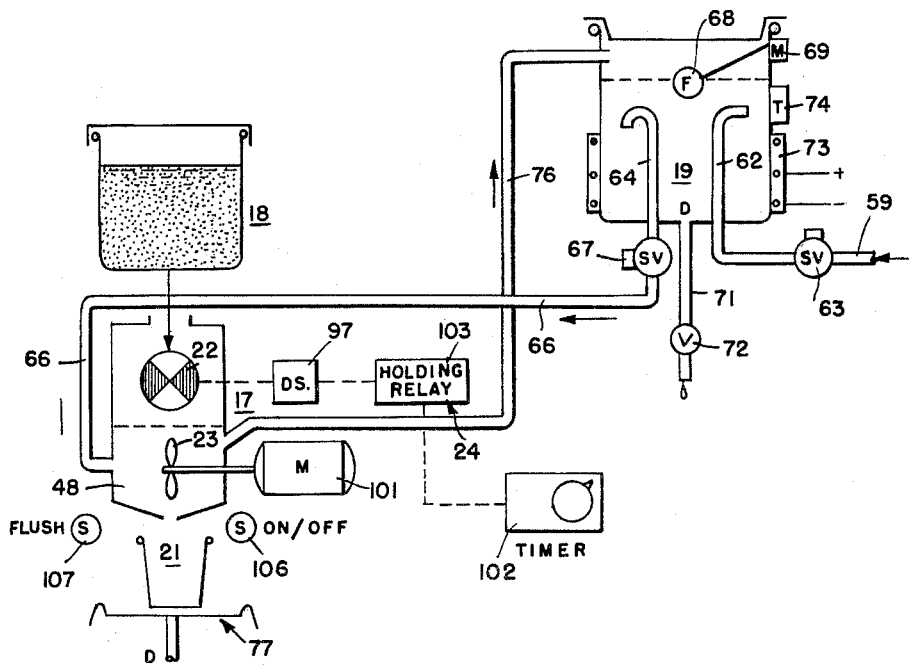
INVENTORS:
RICHARD J. SKIERA
PAUL K. PHILLIPS
BY
ATT'YS United States Patent Office 3,159,190
Patented Dec. 1, 1964

This invention relates to devices for whipping and blending a beverage concentrate and a heated diluting fluid to dispense a hot beverage ready for immediate consumption.

In public eating places, any hot beverage, other than coffee, as a rule has to be specially prepared as and at the time the request is made therefor. For example: An order for hot tea results in the placing before a patron a container of hot water and a tea bag. An order for hot chocolate results in the placing of a powdered concentrate into a container, pouring in the requisite amount of hot liquid and stirring to effect a reasonable blending of the concentrate and liquid. Currently, in public eating places, there is no provision for serving ready-made hot beverages from a dispenser apparatus.

The main objects of this invention are to provide an improved machine for the repeated automatic dispensing, for immediate consumption, of a hot beverage whipped and blended from a concentrate and a heated diluting liquid; to provide a machine of this kind having an improved structure and associated arrangement of concentrate and diluting-liquid reservoirs with a whipping and blending and dispensing mechanism; to provide a machine of this kind with improved means for delivering to the blending-whipping and dispensing mechanism measured quantities of concentrate and heated diluting liquid; to provide an improved beverage-dispensing machine of this kind having electrically controlled means for effecting the repeated manually-initiated time-controlled, automatic operation of the machine to successively blend by whipping, and dispense predetermined quantities of whipped blended beverage; to provide an improved beverage-dispensing machine of this kind especially adapted for use in dispensing a hot beverage blended from a liquid chocolate and heated water; to provide an improved blended-beverage dispensing machine of this kind of such simple and compact structuring as to make its manufacture economical and its operation facile and efficient especially for use by public eating and drinking establishments; and to provide an improved blended-beverage dispensing machine of this kind which, in association with a conventional coin-operated mechanism, could be located for use in public places.

In the adaptation of the whipped-blended-beverage dispensing machine shown in the accompanying drawings:

FIGURE 1 is a front perspective view of a beverage-dispensing machine constructed in accordance with this invention, wherein certain parts of the housing are shown in phantom in retracted positions;

FIG. 2 is a perspective view of the rear of the same machine;

FIG. 3 is a perspective view of the concentrate measuring-blending receptacle and the associated beverage-concentrate and diluting-fluid reservoirs with the enclosing housing indicated in phantom outline;

FIG. 4 is a perspective view of the sides not visible in FIG. 3;

FIG. 5 is a vertical sectional view of the machine constructed in accordance with this invention;

FIG. 6 is an exploded perspective view of a tray for the positioning of containers to receive the blended beverage;

FIG. 7 is a fragmentary, sectional detail of a supporting seal for the cover of the heated-liquid reservoir as shown in the circle indicated by the letter A in the upper right corner of FIG. 5;

FIG. 8 is a vertical sectional view of the concentrate-measuring-blending receptacle, taken on the line 8—8 of FIG. 5;

FIG. 9 is a vertical sectional view taken on the line 9—9 of FIG. 8;

FIG. 10 is a plan view of the concentrate-measuring rotor taken on the line 10—10 of FIG. 8;

FIG. 11 is an end view of FIG. 10, partly in section;

FIG. 12 is a miniature front elevation of the dispensing machine as viewed from the plane of the line 12—12 of FIG. 5;

FIG. 13 is an enlarged, fragmentary, cross-sectional detail taken on the plane of the line 13—13 of FIG. 9 showing the sealing of the two halves forming the measuring and whipping compartments;

FIG. 14 is a schematic arrangement of the primary functioning parts of a blended-beverage dispensing machine constructed in accordance with this invention and as illustrated in the above-explained figures;

FIG. 15 is a schematic view of the electrical circuit and its mechanisms for effecting the controlled operation of this dispensing machine; and FIG. 16 is a schematic view of the float, switch and heater construction.

The essential concept of this invention involves a beverage-concentrate measuring-blending-whipping receptacle juxtaposed to a beverage-concentrate reservoir and a heated liquid-diluting reservoir from which reservoirs measured quantities of the concentrate and liquid are whipped-blended in an agitator chamber to permit the repeated dispensing of a cup of hot beverage of uniform blend and quantity for immediate consumption, as desired.

A blended-beverage dispensing machine embodying the foregoing concept comprises a housing 16 wherein is enclosed a beverage-concentrate measuring-blending receptacle 17 positioned for converting the measured quantity of a beverage concentrate from a reservoir 18 and a diluting liquid from a reservoir 19 for the recurring discharge of a whipped-blended beverage into a container 21 as initiated by a manually-rotatable measuring rotor 22 for activating a motor-driven whipper-agitator 23 operatively regulated by a timer-holding-relay mechanism 24 interposed in an electric circuit 26 (see FIG. 15) connected to a source of electrical current.

The housing 16 here is shown as a multipiece structure of general rectangular form with side walls 27 and rear and front walls 28 and 29 supported on a base 31 (FIG. 5) having corner rubber feet or pads 32 of a material that will avoid injuring contact with a counter or table on which they seat. A nearly-medial horizontal partition 33 divides the interior of the housing 16 into a lower compartment 34, a rear closed compartment, 35, and a forward compartment 36. The compartment 36 is formed by the walls of the hood 37 and is pivotally secured by hinge 46, to the upper wall 41 of the compartment. The rear compartment 35 encloses the hereinafter-described diluting-liquid reservoir 19, which reservoir 19 is closed by a dish-like lid 38 the perimetrical flange 39 of which seats on a rubber or plastic ring 40 which in turn is secured to that part of the upper wall 41 defining the opening 19' which affords access to the compartment 35 and the reservoir 19. The forward compartment 36 encloses the hereinafter-described beverage-concentrate reservoir 18.

The rear vertical wall 28 of the housing 16 and the front wall of the hood 37 are cut out and have panels 42 and 43, respectively, of plastic material inserted therein, Behind these panels 42 and 43 are lights 44 (FIG. 5) for illuminating legends applied to the panels 42 and 43.

The measuring-blending receptacle 17, as best shown in FIGS. 8 and 9, is formed of two identical dish-shaped members 46 of irregular perimetrical contour secured together by suitable fasteners 47 in opposed sealed relationship to form the three vertically-alined chambers 48, 49 and 50 (FIG. 8). Preferably, the members 46 are molded plastic.

The irregular contour of the members 46 is determined by the requirement for having the blending chamber 48 of horizontally-elongated shape for the effective functioning of the agitator 23, having the chamber 49 of cylindrical form for housing the concentrate-measuring rotor 22, and having the chamber 50 of funnel-like form to direct the concentrate from the reservoir 18 to the measuring rotor 22. Such member contour is further influenced by the medial shell-like part 85 providing the somewhat constricted openings 51 and 52—here shown to be arc of somewhat less than 90 degrees—to and from the chamber 49 and through which openings the concentrate respectively enters the measuring rotor 22 and is discharged therefrom into the blending chamber 48.

The perimetrical rims of these two identical dish-shaped members 46 have integrated therewith pointed ribs 53 (FIG. 13). These ribs 53, when the two parts are secured together, come into firm contact to form a perimetrical seal to the chambers 48, 49 and 50.

In their base parts, the members 46 are recessed to provide blended-beverage discharge port 54 from the chamber 48. At the upper ends the members 46 are formed with perimetrical flanges 56 for the support of the concentrate reservoir 18.

This measuring-blending receptacle 17 is mounted on an offset part 30 of the wall 29 of the housing 16 directly below the forward upper compartment 36. A specially-formed housing 55 is suitably attached to the lower peripheral edge of the wall 43 and the horizontal lower wall abut the offset wall part 30 and completely enclose the receptacle 17 in position below the reservoir 18.

The beverage-concentrate reservoir 18 here is shown as being of somewhat elongated rectangular cross section with the lower portion tapered toward a restricted circular port 57 (FIGS. 5, 8, 9) through which the concentrate is directed to the funnel-like chamber 50 of the measuring-blending receptacle 17. A suitable cover 58 sets over the top of the reservoir 18. It is to permit the facile positioning of this reservoir 18 on the receptacle flange 50, with the outlet port 57 set in the funnel chamber 50. The hood 37 is hinged to the housing 16 at 45 to allow swinging the hood into a fully retracted position, as indicated in phantom in FIG. 1.

The diluting-fluid reservoir 19 here is shown as a cylindrical tank set on the housing partition 33 in the upper rear compartment 35. A water-supply pipe 59 is connected in a conventional manner at 61, to the tube 62 extending up into the reservoir 19 with its outlet-end directed toward the thermostat 74. A solenoid-valve 63 (FIGS. 4 and 14) is interposed in the line 59 to regulate the level of liquid in the reservoir 19, as will be explained presently. A dip tube 64 is located in the reservoir 19 and connected in a conventional manner at 65 to a conduit 66 leading to the blending chamber 48. A solenoid valve 67 is interposed in the conduit 66 to regulate the flow of liquid to the blending chamber 48, as will be explained presently.

A conventional float 68, arranged in the reservoir 19, is connected to a mercury switch 69, of normal construction, (see FIGS. 5 and 14) to control the solenoid valve 63 in the conventional manner to maintain a predetermined level of liquid in the reservoir 19.

A drain pipe 71 is connected to the bottom of the reservoir 19 and controlled by a manually-operable valve 72. An electrical heating element 73 embraces the reservoir 19 to maintain the liquid therein at a predetermined temperature regarded as best suited for the most effective blending of the beverage. A conventional thermostat 74 regulates the functioning of the heating unit 73. To obtain quicker heater response the outlet end of pipe 62 is directed towards the thermostat 74. Therefore the cold water entering the chamber 19 being directed at the thermostat causes the thermostat to immediately effect the heater's response to operative condition.

The reservoir 19 has a secondary pipe 76 connected thereto above the liquid level and leading to the blending chamber 48 at a point opposite and, preferably, above the connection of the fluid-supply conduit 66 to the blending chamber 48. The function of this auxiliary pipe 76 will be indicated in the later explanation of the operation of the machine.

The container 21, into which the blended beverage is discharged, from the blending chamber 48, here is shown as a cup. Obviously, the container 21 could be other than such. However, the cup-type container here is shown since the machine is designed primarily for use in public eating places to serve a hot beverage that is to be consumed immediately.

A tray 77, of special form and attachment to the housing 16, positions the container 21 to receive the hot blended beverage as it is discharged through the port 54. Such a tray 77 here is shown as comprising a rectangular-shaped dish-like element 78 in the form of molded plastic. It has a depending perimetrical rim 79, on which it rests, with a depressed interior 80 offset below a perimetrical ledge 81 on which rests a panel 82. The tray 77 is arranged for easy attachment to and removal from the housing 16 in its normal position on a counter or table. An elongated bar 83 is secured, by screws 84, to the under forward edge of the housing base 31 with a portion of the bar 83 exposed outwardly of the housing base 31. The ends of this exposed bar portion are formed with recesses 86 to seat shoulders 87 on the element 78 formed by cutting away the major part of the one side of the supporting rim 79 (FIG. 6). This easy detachment of the tray 77 from the housing 16 and the separation of the element 78 and panel 82, makes for easy and thorough cleaning resulting from the inevitable spilling of beverage on the tray 77.

The rotor 22, for delivering measured quantities of a beverage concentrate from the reservoir 18 to the blending chamber 48, here is shown as a cylinder having a pair of diametrically-opposed pockets 88 formed by pairs of spaced radial ribs 89—89 integrated with a hub 90 and with diametrically-opposite rim segments 91 (FIGS. 8 and 9). As here shown, the pairs of ribs each span an arc of less than 90 degrees, whereas the rim segments 91 are of arcuate length each considerably greater than 90 degrees. This leaves perimetrical spaces between the ends of the segments 91 slightly greater than the openings 51 and 52 of the chamber 49 in which the rotor 22 is journaled. The pockets 88 are closed axially at one end by an integrated plate 92 and at the other end by a plate 93 which is removably secured by screws 93' (see FIGS. 8, 10 and 11). These ribs 89 and the integrated rim segments 91 are relatively positioned circumferentially so that parts of each rim 91 overlaps the corresponding pocket 88 whereby part of each pocket 88, for any position on the rotor 22, is disposed trailing the respective openings 51-52 to and from the chamber 49. The purpose of this formation of the pockets 88 will be indicated in the subsequent explanation of the operation of the machine.

The rotor 22 is fixed on a shaft 94 in bearings 95 integral with the members 46 (FIG. 9). This shaft 94 extends outwardly of the concealing housing 55 and rearwardly through the offset wall 30 (FIG. 5). A knob or handle 96 is keyed to the forward end of the shaft 94 whereby the rotor 22 is turned to successively receive and discharge measured quantities of the beverage concentrate. At the rear end the shaft 94 is connected to a conventional rotor-positioning-detent and control-switch 97 diagrammatically indicated by the rectangles 97 in FIGS. 5 and 14. The detent merely serves to yieldingly position the rotor 22 in its two positions for receiving and discharging measured quantities of the concentrate. The switch is a conventional type whereby each turning of the rotor 22 closes the circuit 26 to effect the requisite action of the timer-holding relay mechanism 24, as will be indicated more fully in the later explanation of the operation of the machine.

The agitator 23 here is shown as a two-vane paddle 98 keyed to a shaft 99 extending from the motor 101 (see FIG. 5) mounted in the lower housing compartment 34, inwardly of the offset wall 30. A bushing 100 is secured in the wall 30 to form a seat for the shaft 99. (See FIG. 10.) The motor 101 is connected in the circuit 26 (FIG. 15) to effect a timed operation of the motor as regulated by the timer-holding-relay mechanism 24.

This timer-holding-relay mechanism 24 is a conventional association of a timer 102 and a holding relay 103 so structured and coordinated that the instantaneous closing of the rotor-operated detent-switch means 97, by the turning of the button 96, will close the circuit 26 and cause the motor 101 to effect such a timed operation of the propeller-agitator 23 as will be required for the desired blending of the beverage and while the beverage remains in the chamber 48. The timer 102 here is shown suspended from the housing partition 33 in the compartment 34 (FIG. 5). The timer 102 includes a rheostat (not shown) to which is connected a pointer 104 movable across a dial 105 to set the desired timed action of the holding relay 103.

Suitably located on the housing 16 are switches 106 and 107 (FIG. 12). The switch 106 is a master switch for cutting in and/or out the circuit 26. The switch 107 is for the purpose of by-passing the switch of the detent-switch means 97, operated by the turning of the knob 96, and thereby make possible an operation cycle for admitting liquid to the blending chamber 48 and initiating an operation of the motor 102 for the purpose of occasionally flushing out the pockets 88 of the concentrate which, over a period of time may tend to adhere to the walls of the concentrate-measuring rotor 22. The manner in which such flushing is attained will be indicated in the following explanation of the operation of the machine.

Wires for the circuit 26 lead from a source of electrical current to a terminal block 108 (FIG. 4) from which connections are made to the several electrical elements of the machine. (FIG. 15.)

The operation of the herein shown and described beverage dispensing machine is as follows:

As a prelude to putting the machine into service for dispensing a hot blended beverage, the reservoir 18 is filled with a predetermined quantity of the beverage concentrate. Concurrently, the reservoir 19 is filled with the liquid and time allowed for it to be heated to the requisite temperature by the thermostat-controlled heater 73.

With a container 21 in place on the tray 77, the knob 96 is given a 180 degree turn. This moves the rotor 22 to bring a pocket 88 thereof, which has become filled with concentrate flowing through the opening 51, into registration with the opening 52 (FIG. 8) for discharge of the concentrate into the blending chamber 48. Such turning of the rotor 22 shifts the detent-switch means 97 to simultaneously yieldingly arrest further movement of the rotor and close the circuit 26 to activate the solenoid valve 67 in the conduit 66 to the reservoir 19, and activate the timer-holding relay mechanism 24. Simultaneously, the heated liquid begins to flow through the conduit 66 to the blending chamber 48 and the agitator 23 is given instantly a high-speed rotation of approximately 8000 r.p.m.

Thus the turning of the knob 96 achieves a practically simultaneous flow of concentrate and liquid to the blending chamber 48 with the action of the agitator 23. The high-speed rotation of the agitator 23 causes such a vigorous churning, and whipping the chamber 48, of the concentrate and liquid, as indicated by the arrows 109, as to effect a thorough whipping and blending thereof, in a few seconds into a ready-to-serve hot beverage. So vigorous is this churning in the chamber 48 that very little if any of the contents in the chamber has an opportunity to escape through the outlet port 54 prior to the arresting of the action of the agitator 23.

By reason of the very high speed of the agitator 23, and the splashing of the contents of the blending chamber 48, any tendency toward creating a back-pressure in the chamber 48 is avoided by reason of the connection of the pipe 76 between the liquid reservoir 19, above the level of the liquid therein, and the blending chamber 48. Such connection permits the churning contents of the chamber 48 to rise in the pipe 76 a sufficient distance to dissipitate any tendency there otherwise might be toward creating a back-pressure.

The instant the timer-holding relay mechanism 24 cuts off current the solenoid valve 67 closes and the agitator 23 quickly becomes inert. The blended beverage thereupon freely flows through the outlet port 54 into the container 21. At the same time any back-up of the chamber contents into the pipe 76 will flow back into the chamber 48 and become a part of the blended beverage draining into the container 21. Thereupon the filled container 21 is ready to be handed to the patron who has requested the beverage which this machine has been equipped to supply.

Because the beverage concentrate may be in syrup form there will be a tendency for films of the concentrate to adhere to the walls of the pockets 88 of the rotor 22. If it becomes necessary, therefore, a frequent flushing of the pockets 88 may be necessary to keep the exposed parts clean of such accumulating films. This is accomplished by simply closing the switch 107, which has the same effect as the closing of the circuit 26 by turning the knob 96 except there will be no concentrate in the lower pocket 88 to flow into the blending chamber 48. However, the closing of the switch 107 activates the timer-holding-relay mechanism 24 precisely as does the turning of the knob 96. Thereupon, the solenoid valve 67 is opened simultaneously with the starting of the motor 101 to cause the rotation of the agitator 23. As the hot liquid begins to flow into the chamber 48, in the absence of concentrate in the pocket 88 of the rotor 22, the high-speed rotation of the two-paddle type agitator 23 tends to sweep the liquid up into the empty pocket 88 and swish it around therein, as indicated by the arrows 110 (FIG. 8). Such churning of the diluted liquid thus will cleanse the walls of the pocket 88 and the mixing chamber 48 of any film of concentrate that may have been clinging thereto. When this cycle of the agitator 23 operation is completed the diluted liquid will run out through the outlet port 54 into the container 21 to be thrown away.

Although but one specific embodiment of this invention is herein shown and described, it will be understood that details of the construction shown may be altered or omitted without departing from the spirit of the invention as defined by the following claims.

We claim:

1. A beverage-dispensing machine comprising, a supporting housing, a blending receptacle fixed on the housing, a motor-driven agitator journaled in the receptacle, juxtaposed beverage-concentrate and diluting-fluid reservoirs positioned adjacent the blending receptacle, a beverage-concentrate measuring element interposed between the blending receptacle and the concentrate reservoir and manually-operable for a flow of a predetermined quantity of concentrate to the blending receptacle, a conduit connecting the blending receptacle with the liquid reservoir, electrically-regulated means interposed in the conduit intermediate the reservoir and the blending receptacle for a controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to the motor and the liquid-measuring means, a circuitry-controlling switch actuated by the manual operation of the concentrate-measuring element for initiating the operation of the timer-holding-relay mechanism to effect the timed operation of the agitator antecedent to the discharge of the beverage from the blending receptacle, and means for positioning a container to receive the beverage from the blending-receptacle.

2. A beverage-dispensing machine comprising, a supporting housing, a blending-receptacle fixed on the housing, a motor-driven agitator journaled in the receptacle, juxtaposed beverage-concentrate and diluting-fluid reservoirs positioned adjacent the blending receptacle, the blending receptacle having a restricted port for the discharge of blended beverage into a container, a cylindrical-like shell interposed between the blending-receptacle and the beverage-concentrate reservoir in vertical alinement with the agitator and having diametrically-opposite peripheral openings communicating respectively with the blending receptacle and the beverage-concentrate reservoir, a rotor journaled in the shell and having diametrically-opposite pockets peripherally registerable with the shell openings, an external knob on the rotor for manually turning the rotor to alternately register the pockets with the beverage-reservoir and the blending receptacle for successively discharging a measured quantity of beverage concentrate to the blending receptacle, a conduit connecting the blending receptacle with the liquid reservoir, electrically-regulated means interposed in the conduit intermediate the reservoir and the blending receptacle for controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to control the agitator motor and the liquid-measuring means, a circuitry-controlling switch actuated by the turning of the rotor knob for initiating the operation of the timer-holding-relay mechanism to effect the timed operation of the agitator antecedent to the discharge of the beverage from the blending receptacle, and means for positioning a container to receive the blended beverage from the blending receptacle.

3. A beverage-dispensing machine comprising, a supporting housing, a blending receptacle fixed on the housing, a motor-driven agitator journaled in the receptacle, juxtaposed beverage-concentrate and diluting-fluid reservoirs positioned adjacent the blending receptacle, the blending receptacle having a restricted port for the discharge of blended beverage into a container, a cylindrical-like shell interposed between the blending receptacle and the beverage-concentrate reservoir in vertical alinement with the agitator and having diametrically-opposite peripheral openings each spanning an arc of less than ninety degrees communicating respectively with the blending receptacle and the beverage-concentrate reservoir, a rotor journaled in the shell and having diametrically-opposite pockets each spanning an arc exceeding ninety degrees and each with a peripheral opening approximating the peripheral openings in the shell and registerable with the shell openings, an external knob on the rotor for manually turning the rotor to alternately register the pockets with the beverage-reservoir and the blending receptacle for successively discharging a measured quantity of beverage concentrate to the blending receptacle, a conduit connecting the blending receptacle with the liquid reservoir, electrically-regulated means interposed in the conduit intermediate the reservoir and the blending receptacle for controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to control the agitator motor and the liquid-measuring means, a circuitry-controlling switch actuated by the turning of the rotor knob for initiating the operation of the timer-holding-relay mechanism to effect the timed operation of the agitator antecedent to the discharge of the beverage from the blending receptacle, and means for positioning a container to receive the blended beverage from the blending receptacle.

4. A beverage-dispensing machine comprising, a housing, juxtaposed beverage-concentrate and diluting-fluid reservoirs in the housing, an adjacent combination beverage-concentrate measuring and blending receptacle consisting of a pair of identical dish-shaped parts of irregular contour each part having a pointed ridge medially integrated with the respective rims, the two parts being bonded together with the pointed rims contacting to define a perimetrical seal to three vertically-arranged chambers, a lower horizontally-elongated beverage-blending chamber having a restricted port for the discharge of blended beverage into a container, an upper vertically-extending circular beverage-concentrate receiving chamber, an intermediate horizontally-extending circular beverage-concentrate measuring chamber communicating with the upper and lower chambers through diametrically-opposite limited openings, a motor-driven agitator with diametrically-opposed vanes centrally journaled in the lower chamber directly below the opening from the intermediate chamber, a rotor journaled in the intermediate chamber and having diametrically-opposite pockets each spanning an arc exceeding ninety degrees and each with a peripheral opening approximating the limited openings of the intermediate chamber communicating with the lower and upper chambers, an external knob on the rotor for manually turning the rotor to alternately register the pockets respectively with the beverage-concentrate chamber and the blending chamber for successively discharging a measured quantity of beverage concentrate into the blending chamber, a conduit connecting the blending chamber with the liquid reservoir, electrically-regulated means interposed in the conduit intermediate the reservoir and the blending chamber for controlled flow of a measured quantity of liquid to the blending chamber independently of the rotation of the agitator in the chamber, electrical circuitry connecting the agitator motor and the liquid-measuring means with a source of electrical current, a timer-holding-relay mechanism interposed in the circuitry and connected to control the agitator motor and the liquid-measuring means, a circuitry-controlling switch actuated by the turning of the rotor knob for initiating the operation of the timer-holding-relay mechanism to effect the timed operation of the agitator antecedent to the discharge of the beverage from the blending chamber, and means for positioning a container to receive the blended beverage from the blending chamber.

5. A beverage-dispensing machine comprising, a supporting housing, a blending receptable fixed on the housing, a motor-driven agitator journaled in the receptacle, juxtaposed beverage-concentrate and diluting-fluid reservoirs positioned adjacent the blending receptable, a beverage-concentrate measuring element interposed between the blending receptacle and the concentrate reservoir and manually operable for a flow of a predetermined quantity of concentrate to the blending receptacle, a conduit connecting the blending receptacle with the liquid reservoir, electrically-regulated means interposed in the conduit intermediate the reservoir and the blending receptacle for a controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to the motor and the liquid-measuring means, a circuitry-controlling switch actuated by the manual operation of the concentrate-measuring element for initiating the operation of the timer-holding-relay mechanism to effect the timed operation of the agitator antecedent to the discharge of beverage from the blending receptacle, means for positioning a container to receive the beverage from the blending receptacle, and an overflow conduit connecting the blending receptacle with the liquid reservoir to afford back-pressure relief during the operation of the agitator.

6. A beverage-dispensing machine comprising, a supporting housing, a blending receptacle fixed on the housing, a motor-driven agitator journaled in the receptacle, juxtaposed beverage-concentrate and diluting-fluid reservoirs positioned adjacent the blending receptacle, a beverage-concentrate measuring element interposed between the blending receptacle and the concentrate reservoir and manually-operable for a flow of a predetermined quantity of concentrate to the blending receptacle, a conduit connecting the blending receptacle with the liquid reservoir, electrically-regulated means interposed in the conduit intermediate the reservoir and the blending receptacle for a controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to the motor and the liquid-measuring means, a circuitry-controlling switch actuated by the manual operation of the concentrate-measuring element for initiating the operation of the timer-holding-relay mechanism to effect the timed operation of the agitator antecedent to the discharge of beverage from the blending receptacle, means for positioning a container to receive the beverage from the blending receptacle, a microswitch control means for regulating the supply of liquid to the reservoir, and a liquid-motivated float in the reservoir connected to the microswitch for maintaining a predetermined level of liquid in the liquid reservoir.

7. A beverage-dispensing machine comprising, a supporting housing, a blending receptacle fixed on the housing, a motor-driven agitator journaled in the receptacle, juxtaposed beverage-concentrate and diluting-fluid reservoirs positioned adjacent the blending receptacle, thermostatically-controlled means for maintaining the diluting-liquid in the reservoir at a predetermined temperature, a beverage-concentrate measuring element interposed between the blending receptacle and the concentrate reservoir and manually-operable for a flow of a predetermined quantity of concentrate to the blending receptacle, a conduit connecting the blending receptacle with the liquid reservoir, electrically-regulated means interposed in the conduit intermediate the reservoir and the blending receptacle for a controlled flow of a measured quantity of liquid to the blending receptacle independently of the rotation of the agitator in the blending receptacle, electrical circuitry connecting the agitator motor and he liquid-measuring means with a source of electrical current, a timer-holding-relay mechanism interposed in the circuitry and connected to the motor and the liquid-measuring means, a circuitry-controlling switch actuated by the manual operation of the concentrate-measuring element for initiating the operation of the timer-holding-relay mechanism to effect the timed operation of the agitator antecedent to the discharge of beverage from the receptacle, means for positioning a container to receive the beverage from the blending receptacle, an overflow conduit connecting the blending receptacle with the liquid reservoir to afford back-pressure relief during the operation of the agitator, a microswitch control means for regulating the supply liquid to the reservoir, and a liquid-motivated float in the reservoir connected to the microswitch for maintaining a predetermined level of liquid in the liquid reservoir.

8. A beverage-dispensing machine comprising, a supporting housing, a blending receptacle fixed on the housing, a motor-driven agitator journaled in the receptacle, juxtaposed beverage-concentrate and diluting-fluid reservoirs positioned adjacent the blending receptacle, thermostatically-controlled means for maintaining the diluting fluid in the reservoir at a predetermined temperature, the blending receptacle having a restricted port for the discharge of blended beverage into a container, a cylindrical-like shell interposed between the blending receptacle and the beverage-concentrate reservoir in vertical alinement with the agitator and having diametrically-opposite peripheral openings communicating respectively with the blending receptacle and the beverage-concentrate reservoir, a rotor journaled in the shell and having diametrically-opposite pockets peripherally registerable with the shell openings, an external knob on the rotor for manually turning the rotor to alternately register the pockets with the beverage-reservoir and the blending receptacle for successively discharging a measured quantity of beverage concentrate to the blending-receptacle, a conduit connecting the blending receptacle with the liquid reservoir, electrically-regulated means interposed in the conduit intermediate the reservoir and the blending receptacle for controlled flow of a measured quantity of liquid to the blending receptacle independently of the rotation of the agitator in the blending receptacle, electrical circuitry connecting the agitator motor and the liquid-measuring means with a source of electrical current, a timer-holding-relay mechanism interposed in the circuitry and connected to control the agitator motor and the liquid-measuring means, a circuitry-controlling switch actuated by the turning of the rotor knob for initiating the operation of the timer-holding-relay mechanism to effect the timed operation of the agitator antecedent to the discharge of beverage from the blending receptacle, and means for positioning a container to receive the blended beverage from the blending receptacle.

9. A beverage-dispensing machine comprising, a housing, juxtaposed beverage-concentrate and diluting-fluid reservoirs in the housing, thermostatically-controlled means for maintaining the liquid in the reservoir at a predetermined temperature, an adjacent combination beverage-concentrate measuring and blending receptacle consisting of a pair of identical dish-shaped parts of irregular contour, each part having a pointed ridge medially integrated with the respective rims, the two parts being bonded together with the pointed rims contacting to define a perimetrical seal to three vertically-arranged chambers, a lower horizontally-elongated beverage-blending chamber having a restricted port for the discharge of blended beverage into a container, an upper vertically-extending circular beverage-concentrate receiving chamber, an intermediate horizontally-extending circular beverage-concentrate measuring chamber communicating with the upper and lower chambers through diametrically-opposite limited openings, a motor-driven agitator with diametrically-opposed vanes centrally journaled in the lower chamber directly below the opening from the intermediate chamber, a rotor journaled in the intermediate chamber and having diametrically-opposite pockets each spanning an arc exceeding ninety degrees and each with a peripheral opening approximating the limited opening of the intermediate chamber communicating with the lower and upper chambers, an external knob on the rotor for manually turning the rotor to alternately register the pockets respectively with the beverage-concentrate chamber and the blending chamber for successively discharging a measured quantity of beverage concentrate into the blending chamber, a conduit connecting the blending chamber with the liquid reservoir, means interposed in the conduit for controlled flow of a measured quantity of liquid to the blending chamber, electrical circuitry connecting the agitator motor and the liquid-measuring means with a source of electrical current, a timer-holding-relay mechanism interposed in the circuitry and connected to control the agitator motor and the liquid-measuring means, a circuitry-controlling switch actuated by the turning of the rotor knob for initiating the operation of the timer-holding-relay mechanism, and means for positioning a container to receive the blended beverage from the blending chamber.

10. A beverage-dispensing machine comprising, a housing divided by horizontal and vertical partitions into two upper compartments above a lower compartment, a liquid reservoir arranged in one of the upper compartments and having a solenoid-valve-controlled conduit for regulating the supply of liquid to the reservoir, a microswitch for operating the solenoid valve, a beverage-concentrate reservoir arranged in the other upper chamber forwardly of the liquid reservoir with an outlet port in the bottom thereof, a pair of identical dish-shaped parts of irregular contour secured together on the housing and defining three chambers vertically-alined with the outlet port in the beverage-concentrate reservoir, a lower horizontally-elongated beverage-blending chamber having a restricted opening for the discharge of blended beverage into a container, an upper vertically-extending circular chamber communicating directly with the outlet port in the beverage concentrate reservoir, an intermediate horizontally-extending circular beverage-concentrate-measuring chamber communicating with the upper and lower chambers through diametrically-opposite restricted openings, a motor-driven agitator with diametrically-opposed vanes centrally journaled in the lower chamber directly below the opening from the intermediate chamber, a rotor journaled in the intermediate chamber having diametrically-opposite pockets with perimetrical openings approximating the openings from the intermediate chamber into the lower and upper chambers, an external knob on the rotor for manually turning the rotor to alternately register the pockets respectively with the openings to the beverage-concentrate reservoir and to the blending chamber for successively discharging a measured quantity of beverage concentrate into the blending chamber, a conduit connecting the blending chamber with the liquid reservoir, electrically-regulated means interposed in the conduit intermediate the reservoir and the blending receptacle for a controlled flow of a measured quantity of liquid to the blending chamber independently of the rotation of the agitator in the blending receptacle, electrical circuitry connecting the agitator motor and the liquid-measuring means with a source of electrical current, a timer-holding-relay mechanism interposed in the circuitry and connected to the agitator motor and the liquid-measuring means, a circuitry-controlling switch actuated by the turning of the rotor knob or initiating the operation of the timer-holding-relay mechanism to effect the timed operation of the agitator antecedent to the discharge of beverage from the chamber, means for positioning a container to receive blended beverage from the blending chamber, and a liquid-motivated float in the liquid reservoir connected to the microswitch for maintaining a predetermined supply of liquid in the liquid reservoir.

References Cited in the file of this patent

UNITED STATES PATENTS

| | | |
|---|---|---|
| 2,452,933 | Joppich et al. | Nov. 2, 1948 |
| 2,614,738 | Mills | Oct. 21, 1952 |
| 2,796,200 | Lambert et al. | June 18, 1957 |
| 2,848,140 | Gabrielsen | Aug. 19, 1958 |
| 2,880,912 | Fisher | Apr. 7, 1959 |